Jan. 21, 1930.  L. E. IKE  1,744,701
AUTOMOBILE BED
Filed June 7, 1928
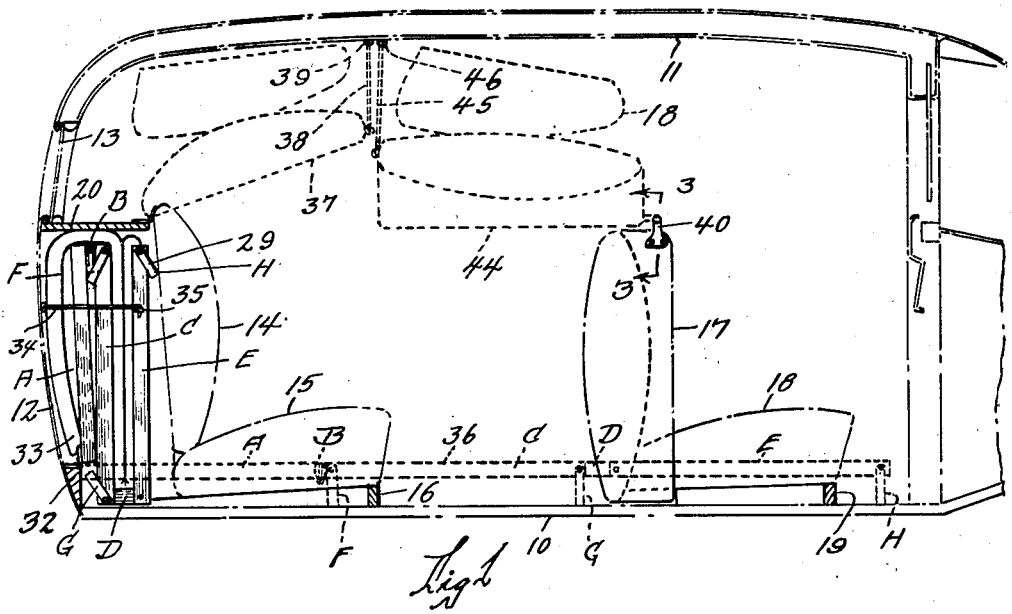
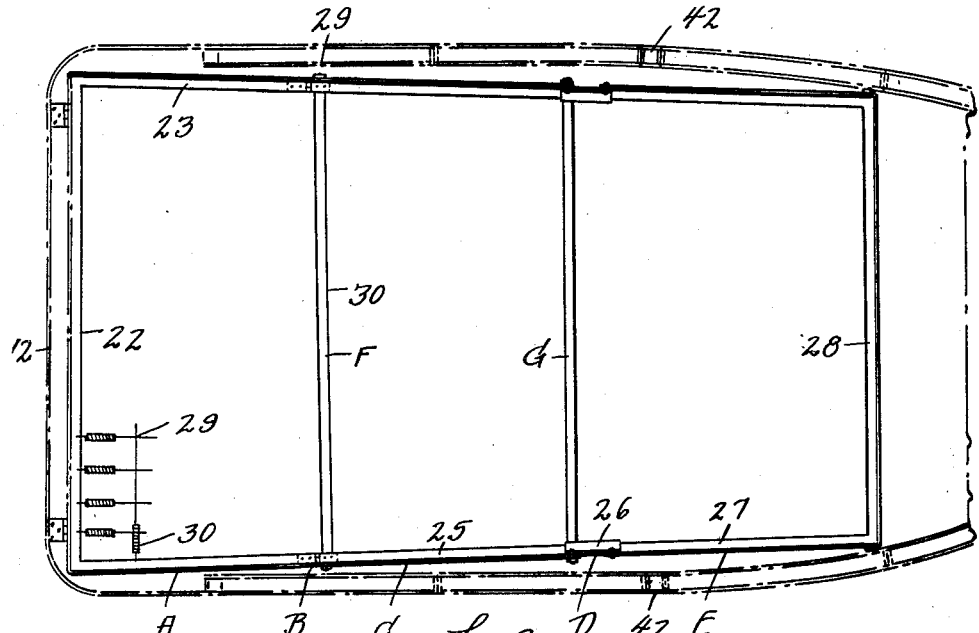
Inventor
Lester E. Ike
By Lynn H Latta
Attorney Patented Jan. 21, 1930

1,744,701

UNITED STATES PATENT OFFICE

LESTER E. IKE, OF PLAINVIEW, NEBRASKA

AUTOMOBILE BED

Application filed June 7, 1928. Serial No. 283,541.

My invention relates to automobile beds of the type disclosed in my issued Patent #1,-649,233 and my co-pending application, Serial #129,563, and has for its object generally to improve upon the constructions shown in said application and said patent.

More specifically, it is my object to provide an automobile bed construction of the general type of my former inventions which, however, does not necessitate the removal of the seat boxes of the vehicle during the operation of extending it to sleeping position.

Another object is to provide a bed of the type foldable within a compartment behind the rear seat back of a vehicle which may be lifted from folded to extended position without the aid of guide rods, cables or the like, such as are employed in the constructions of my former inventions.
Another object is to provide a bed having the foregoing characteristics and which is foldable entirely behind the back of the rear seat of a vehicle, thereby not necessitating the raising of the seat cushion, in driving position.

Another object is to provide a bed having the foregoing characteristics and yet which preserves the quality of being foldable with the bedding in place.
With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a longitudinal, vertical, sectional view through a vehicle equipped with my invention, the vehicle being shown diagrammatically in broken lines.

Fig. 2 is a plan view of the bed, the vehicle being shown diagrammatically in broken lines.
Fig. 3 is a detail, sectional view taken on the line 3—3 of Fig. 1.

I have used the reference character 10 to indicate the floor of a vehicle having the top 11, the rear wall 12, the rear window 13, the rear seat back 14, the rear seat cushion 15, the rear seat box 16, the front seat back 17, the front seat cushion 18 and the front seat box 19.

A shelf 20 is extended from side to side of the car just below the window 13 and the back 14 is hinged as at 21 to the shelf as in my preceding inventions. The shelf 20, however, is somewhat wider than the shelf of the preceding types of my invention in order to provide a wider space for the reception of the folded bed than is provided in my preceding constructions. The bed is formed of angle irons for horizontal flanges at the bottom in the extended bed connected by netting, as in the beds of my preceding inventions. The bed includes a rear section A, having the rear cross member 22 and the side rails 23.

Hinged at B to the short section A is the intermediate section C, comprising a pair of rails 25. Hinged to the intermediate section C is the forward short section D, comprising a pair of short rail elements 26.

Hinged to the forward short section D is the forward section E, comprising a pair of side rail members 27 and the forward cross member 28.

The netting 29 is connected through the medium of springs 30 to all of the rail members 22, 23, 24, 25, 26, 27 and 28, respectively, thus forming, when the sections are extended into alignment with each other, a complete rectangular bed structure.

In order to support the bed sections against collapsing inwardly under the urge of the springs and the weight of the sleeper, I provide the combined legs and spreaders F, and G, each of which comprises a U shaped yoke including the side legs 29 and the cross members 30.

The spreader F is connected to the bed adjacent the hinge between the sections A and C.

The spreader G is secured to the bed near the joint between the sections C and E, which may be considered as being hinged to each other through the medium of the short section D.

The spreader G may thus be secured to the bed either near the hinge between the sections C and D or near the hinge between the sections D and E. Inasmuch as the majority of the weight of an occupant is carried by the intermediate section of the bed, the spreaders are preferably secured to that section.

The legs H are secured at the forward end of the bed, and do not include a spreader.

The rear section A is shorter than the intermediate and forward sections C and E, respectively, and is hinged to a frame member 32, extending transversely of the vehicle at the rear, lower corner thereof in a horizontal plane which is above the level of the seat boxes 16. Thus the sections C and E extend down into the rear seat boxes utilizing all of the space within the compartment provided for the folded bed.

The hinge between the sections A and C is formed in such a manner as to allow the sections to break upwardly. The hinge sections C and E are formed so as to prevent upward breaking but to allow downward breaking of the sections relative to each other. This is attained either by allowing the ends of the sections to abut against each other or by allowing the horizontal flanges of the sections to overlap.

It will now be seen that with the sections formed to break in the directions indicated, the bed may be folded as shown in Fig. 1, with the rear section A extending upwardly from the hinge 32, the intermediate section C thence extending downwardly from the rear section A, the forward short section D thence extending forwardly from the intermediate section and the forward section E thence extending upwardly from the forward short section D with the three main sections A, C and E extending vertically closely adjacent each other and substantially parallel to each other.

The bedding which is shown at 33 in Fig. 1 is folded with the bed, being received between the sections C and E and thence extending over the section B and behind the section A.

The dimensions longitudinally of the vehicle of the folded bed in Fig. 1 are exaggerated somewhat in order to more clearly illustrate the method of folding.

The spreaders F and G may be folded against the sections as shown in Fig. 1 when the bed is folded. The folded bed is securely held in place by a hook 34, which is pivoted to the rear wall 12 of the vehicle and which hooks into an eye 35 on the forward section E. This securely holds all of the sections in folded position, the bedding being tightly held against jarring loose by the folded bed.

When the bed is extended, it assumes the position shown in dotted lines at 36 in Fig. 1. It will be noted that the level of the extended bed is sufficiently above the seat boxes 16 to allow a certain amount of sag and proper sleeping comfort.

The bed is moved to its extended position by unhooking the hooks 34 and simply grasping the forward section and lifting forwardly and upwardly. This carries the forward and intermediate sections forwardly and upwardly while allowing the rear section to swing forwardly and downwardly, clearing the shelf 20. The bed is lifted from between the sides of the seat box 16 over the front portion of the seat box and into its extended position.

The seat back 14 is raised to disclose the bed compartment to the position shown at 37 in dotted lines in Fig. 1 and is there held by means of a hook 38, hooked into an eye 39 in the ceiling 11. The cushion 15 is then inserted into the space above the back 37 and supported upon the back, as in the construction of my preceding inventions.

The front seat back 17 is pivoted by means of a pair of brackets 40 to the sides of the vehicle, the trunnions 41 of the brackets 40 being received in the posts 42 separating the doors of the vehicle or in some other portion of the solid frame of the vehicle.

The seat back 17 may thus be swung upwardly to the dotted line position shown at 44 in Fig. 1 and is there held by a hook 45, secured into an eye 46 in the ceiling 11.

The cushion 18 is supported above the back 17 in the same manner as with the rear cushion.

The advantages of the present invention are several. The construction is much simpler than any preceding construction of spring beds and retains all of the advantages of folding out of sight behind the rear seat, ease of operation and the affording of perfect rest, which are found in the constructions of my preceding inventions.

In addition to this advantage of increased simplicity of construction, the present invention does away with the necessity of raising the cushion of the rear seat and the removal of the seat box.

The hinge 32 secures the rear section rigidly against lateral movement so that as the bed is moved to its extended position, the rear section serves to guide it to its proper extended position. The only action on the part of the operator which is then necessary is to lift the forward section forwardly and upwardly to clear the seat boxes.

The weight of the rear section as it descends will aid in the forward movement of the bed.

The folding of the bed into the compartment provided for it is a natural fold, it being only necessary to lift upon the hinge between the rear and intermediate sections so as to produce an angle between them and thence to grasp the forward section and push rearwardly. The bed will then naturally assume the S shaped formation of its folded position, the bedding also conforming easily to the shape of the bed.

The hinge 32 determines the level of the bed in its horizontal position, the spreaders are made the proper height to position the remainder of the bed at this level. The hinge 32 thus serves the double purpose of a hinge and the support for the end of a rear section.

The simplification involved in the present construction is comprised in the doing away with the guide rods, cables and pulleys of the constructions of my preceding inventions.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. An automobile bed for a vehicle having a rear seat, a rear seat box, and a shelf to which the rear seat is hinged to form a compartment to receive the bed when folded, comprising; a rear bed section hinged to the vehicle near the floor but above the level of the box, an intermediate section hinged to the rear section, the two sections being adapted to break upwardly at their joint and to assume substantially vertical positions within the compartment, a short section hinged to the intermediate section, a forward section hinged to the short section, the forward and intermediate sections being adapted to break downwardly relative to each other whereby the forward section may assume a position extending upwardly from its joint, parallel with, and in front of, the intermediate section, the sections being adapted to be lifted over the seat box, to positions extending horizontally thereover, and the rear section serving to guide them to their proper extended positions.

2. An automobile bed for a vehicle having a rear seat, a rear seat box, and a shelf to which the rear seat is hinged to form a compartment to receive the bed when folded, comprising; a rear bed section hinged to the vehicle near the floor but above the level of the box, an intermediate section hinged to the rear section, the two sections being adapted to break upwardly at their joint and to assume positions that are substantially vertical within the compartment, a short section hinged to the intermediate section, and a forward section hinged to the short section, the intermediate section extending beyond the lower end of the rear section and into the space within the seat box, the forward and intermediate sections being adapted to break downwardly relative to each other, whereby the forward section may assume a position extending upwardly from its joint, parallel with, and in front of, the intermediate section, the forward and intermediate sections being adapted to be lifted over the box, to positions extending horizontally thereover, and the rear section serving to guide them to their proper positions.

3. An automobile bed for a vehicle having a rear seat, a rear seat box, and a shelf to which the rear seat back is hinged to form a compartment to receive the bed when folded, comprising; a rear bed section hinged to the vehicle near the floor but above the level of the box, an intermediate section hinged to the rear section, the two sections being adapted to break upwardly at their joint and to assume substantially vertical positions within the compartment, a short section hinged to the intermediate section, a forward section hinged to the short section, the forward and intermediate sections being adapted to break downwardly relative to each other whereby th forward section may assume a position extending upwardly from its joint, parallel with, and in front of the intermediate section, the sections being adapted to be lifted over the box to positions extending horizontally thereover, and the rear section serving to guide them to their extended positions, and means adapted to be secured to the forward section and to the back of the vehicle, to hold the forward section in its vertical position, and to thereby secure the other sections in their folded positions.

Signed this 25th day of May, 1928, in the county of Pierce and State of Nebraska.

LESTER E. IKE.